United States Patent
Harris

(10) Patent No.: US 11,093,942 B2
(45) Date of Patent: *Aug. 17, 2021

(54) PEEL AND STICK ACTIVATION CODE FOR ACTIVATING SERVICE FOR A WIRELESS DEVICE

(71) Applicant: TracFone Wireless, Inc., Miami, FL (US)

(72) Inventor: Wendy Harris, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,503

(22) Filed: Jul. 19, 2019

(65) Prior Publication Data

US 2019/0340612 A1 Nov. 7, 2019

Related U.S. Application Data

(63) Continuation-in-part of application No. 14/992,239, filed on Jan. 11, 2016, now Pat. No. 10,362,179.

(60) Provisional application No. 62/101,606, filed on Jan. 9, 2015.

(51) Int. Cl.
  *G06Q 20/40* (2012.01)
  *G06Q 20/28* (2012.01)
  *G06Q 20/20* (2012.01)
  *H04L 29/06* (2006.01)

(52) U.S. Cl.
  CPC ......... *G06Q 20/4012* (2013.01); *G06Q 20/20* (2013.01); *G06Q 20/28* (2013.01); *H04L 67/42* (2013.01)

(58) Field of Classification Search
  CPC ...... G06Q 20/20; G06Q 20/28; G06Q 20/342; G06Q 20/354; G06Q 20/4012
  USPC ........................................................ 455/406
  See application file for complete search history.

(56) References Cited

U.S. PATENT DOCUMENTS

| | | |
|---|---|---|
| 6,654,600 B1 | 11/2003 | Pollak et al. |
| 2004/0007618 A1 | 1/2004 | Oram et al. |
| 2006/0015402 A1 | 1/2006 | Graves et al. |
| 2007/0251994 A1 | 11/2007 | Kingsborough et al. |
| 2011/0161185 A1* | 6/2011 | Antoo .................... G06Q 20/28 705/16 |
| 2013/0024379 A1* | 1/2013 | Di Tucci ................ G06Q 20/32 705/44 |
| 2013/0124277 A1 | 5/2013 | Dooley et al. |
| 2013/0196619 A1 | 8/2013 | Ju et al. |
| 2015/0081527 A1 | 3/2015 | Tan |
| 2016/0012465 A1* | 1/2016 | Sharp ................... G06Q 20/386 705/14.17 |

* cited by examiner

*Primary Examiner* — Charles N Appiah
*Assistant Examiner* — Nicole M Louis-Fils
(74) *Attorney, Agent, or Firm* — BakerHostetler

(57) ABSTRACT

A system for adding, authorizing, or activating pre-paid wireless service includes a sticker, and a server. The sticker has an authorization code. The sticker is configured to be affixed to a surface of a product. The server is configured to receive the authorization code. The server is further configured to verify that the received authorization code is authentic. The server is further configured to at least one of add, authorize, and activate wireless service in response to receiving and verifying the received authorization code.

20 Claims, 7 Drawing Sheets

PEEL AND STICK ACTIVATION CODE FOR ACTIVATING SERVICE FOR A WIRELESS DEVICE

CROSS REFERENCE TO PRIOR APPLICATIONS

This application is a continuation in part of U.S. patent application Ser. No. 14/992,239, filed Jan. 11, 2016, which issued as U.S. Pat. No. 10,362,179 on Jul. 23, 2019, which is incorporated herein by reference in its entirety; which application claims the benefit of U.S. Provisional Application No. 62/101,606 filed on Jan. 9, 2015, which is hereby incorporated by reference for all purposes as if fully set forth herein.

BACKGROUND OF THE DISCLOSURE

Field of the Disclosure

The disclosure relates to devices and methods for adding, authorizing, and/or activating prepaid wireless service for a wireless device. More particularly, the disclosure relates to devices and methods for adding, authorizing, and/or activating prepaid wireless services for a wireless device.

BACKGROUND

Wireless service takes one of two forms. A first form is postpaid contract-based subscription with a wireless service provider (e.g. "provider"). The user is usually billed on a monthly basis for the service. While a deposit may be required to initiate service, the user pays for the monthly wireless services used at the end of the month, after having already used the wireless services. Thus, credit must be extended to the user so as to allow the payment to follow the provision of services. However, certain users may not want to be burdened by such contract-based wireless service. Some users also do not like unexpected large bills for wireless services used. Accordingly, users may find pre-paid wireless services attractive.

Providers offering pre-paid wireless services allow the user the option of paying for a predetermined amount of wireless services prior to using the service. Thus, the provider is not extending credit to the user, as payment for the services is made in advance. The wireless user is accordingly not surprised by large wireless service bills. Moreover, the user is not burdened and held to a contract that will bind them to the wireless service provider for years.

Typically, a user wishing to purchase pre-paid wireless services from a wireless provider, purchases a card having an authorization code. The authorization codes enables the wireless device for a predetermined time, set amount of airtime, set amount of text messages, set amount of data, a combination thereof, and/or the like. The authorization code corresponds to a credit level. The user may purchase the card from a merchant, from the wireless service provider, or a provider website. These cards are typically sold separately from the wireless device.

If the user desires to obtain wireless services when purchasing the wireless device, the user must know to purchase the card in addition to the wireless device. Unfortunately, different merchants typically have different sets of activation codes. As such, inventory management can become an issue.

There is, however, no convenient way to provide pre-paid wireless services for wireless devices that will be sold by multiple merchants. Therefore, there is a need for a convenient and efficient process and system for authorizing the use of multiple pre-paid wireless devices.

SUMMARY OF THE DISCLOSURE

In accordance with the disclosure, a device and method for authorizing wireless service for a wireless device is provided. The device provide a convenient and efficient way to provide authorization codes for wireless devices sold at a variety of merchants.

In one aspect a system for adding, authorizing, or activating pre-paid wireless service includes a sticker, and a server. The sticker has an authorization code. The sticker is configured to be affixed to a surface of a product. The server is configured to receive the authorization code. The server is further configured to verify that the received authorization code is authentic. The server is further configured to at least one of add, authorize, and activate wireless service in response to receiving and verifying the received authorization code.

In another aspect a method for adding, authorizing, or activating pre-paid wireless service includes the method steps of affixing a sticker having an authorization code to a product, verifying that the authorization code is authentic, and at least one of adding, authorizing, and activating wireless service in response to receiving and verifying the authorization code.

In yet another aspect a method for adding, authorizing, or activating a pre-paid wireless service, includes the method steps of providing a first web page with the server system to a user of the service. The first web page includes at least an interface for entering information. The method further includes the step of providing an interface with the server system on said first web page for purchasing additional airtime for a wireless device user. The method further includes the step of receiving a request with the server system for the purchase of additional wireless service. The request includes financial transaction data for purchasing additional airtime. The method further includes the step of transmitting with the server system a print file configured to print a sticker. The sticker includes an authorization code in response to the purchase of additional wireless service.

In a further aspect a system for adding, authorizing, or activating a pre-paid wireless service, includes a server. The server is configured to provide a first web page to a user including at least an interface for entering information. The server is further configured to provide an interface on said first web page for purchasing additional airtime for a wireless device user. The server is configured to receive a request with for the purchase of additional wireless service. The request includes financial transaction data for purchasing additional airtime. The server is configured to transmit a print file for a sticker having an authorization code in response to the purchase of additional wireless service.

In yet a further aspect a device for adding, authorizing, or activating pre-paid wireless service includes an authorization code printed on a sticker surface. The authorization codes includes a format that is configured to be verified as authentic by a pre-paid wireless service. The verified authorization code is configured to at least one of add, authorize, and activate pre-paid wireless service.

The foregoing needs are met, to a great extent, by the disclosure, with a device and process configured to conveniently provide wireless services for multiple users. In particular, the disclosure is intended to solve the challenges of providing multiple users, such as a family, with wireless services for each of their wireless devices.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Reference in this specification to a wireless device is intended to encompass devices such as mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as wireless handset, handset, mobile device, device, mobile phones, mobile equipment, mobile station, "user equipment, cellular phone, smartphones, or phone.

Wireless devices may connect to a wireless network or network and are intended to encompass any type of wireless network to obtain mobile phone services through the use of a wireless device, such as a Global System for Mobile Communication (GSM) network, Code-Division Multiple Access (CDMA) network, Long Term Evolution (LTE) network or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not other aspects.

Figure 1:
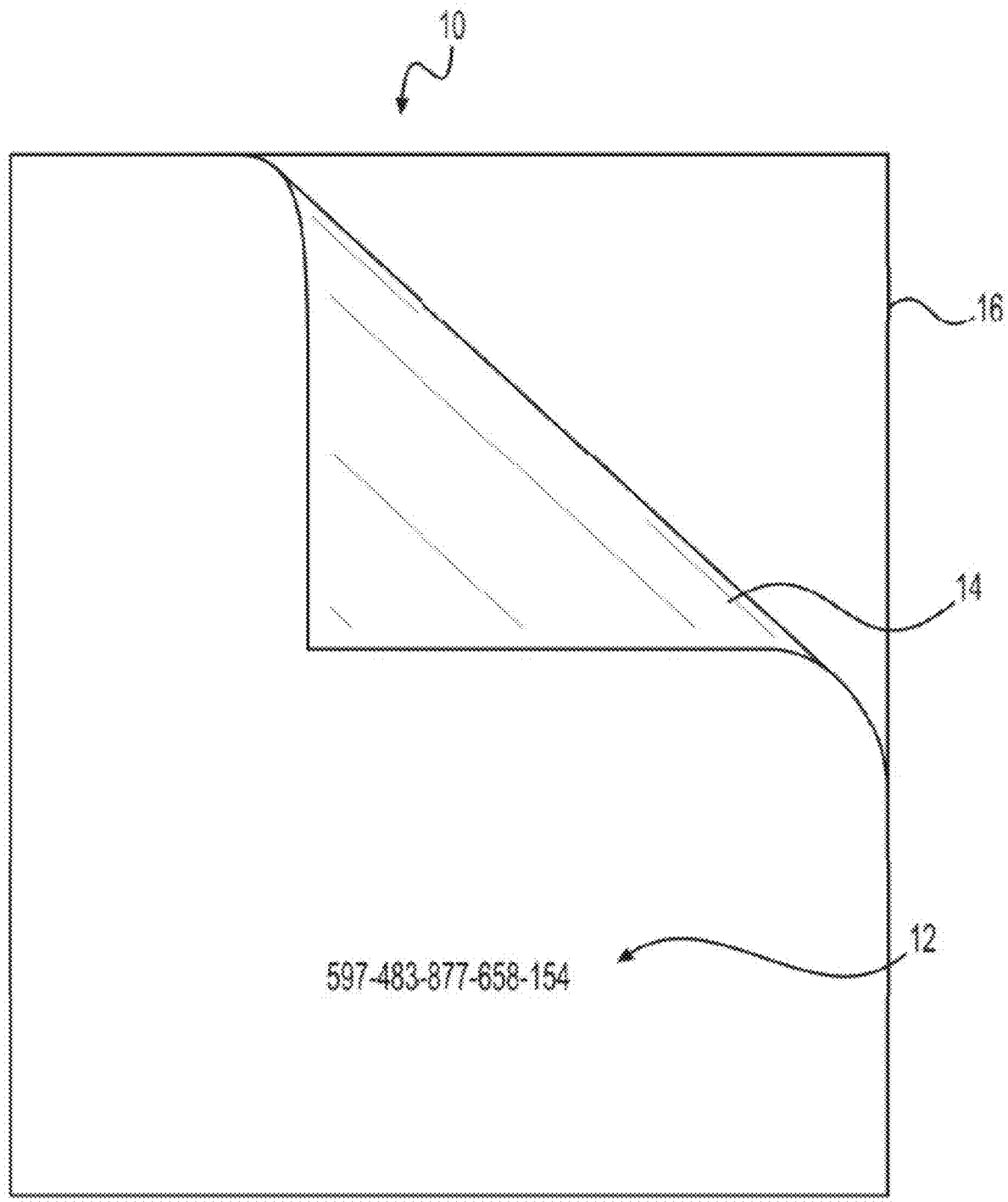
FIG. 1 shows a sticker having a wireless authorization code according to the disclosure.

FIG. 1 shows a sticker having a wireless authorization code according to the disclosure. In particular, FIG. 1 shows a sticker 10 having a wireless authorization code 12, an adhesive 14, and a backing 16. The authorization code 12 may provide a predetermined amount of wireless service and/or the amount of wireless service may be purchased or augmented at the point of sale. The predetermined amount of wireless service and/or purchased service may include one or more or a combination of wireless services. The wireless services may include wireless airtime, wireless messaging, wireless data, days of service, or the like. The aspect of the sticker 10 shown in FIG. 1 being a stand-alone device is merely exemplary. The sticker 10 can be sold in the same manner as a pre-paid card and/or the sticker 10 may be affixed to a product or packaging for the product. For example, the sticker 10 may be sold alone or as a set of stickers and purchased by the wireless user at a retail establishment, over the telephone, by mail, through a wireless service provider website or the like. Alternatively, the sticker 10 may be affixed to any suitable product and purchased by the wireless user at the retail establishment, over the telephone, by mail, through a wireless service provider website or the like.

Figure 2A:
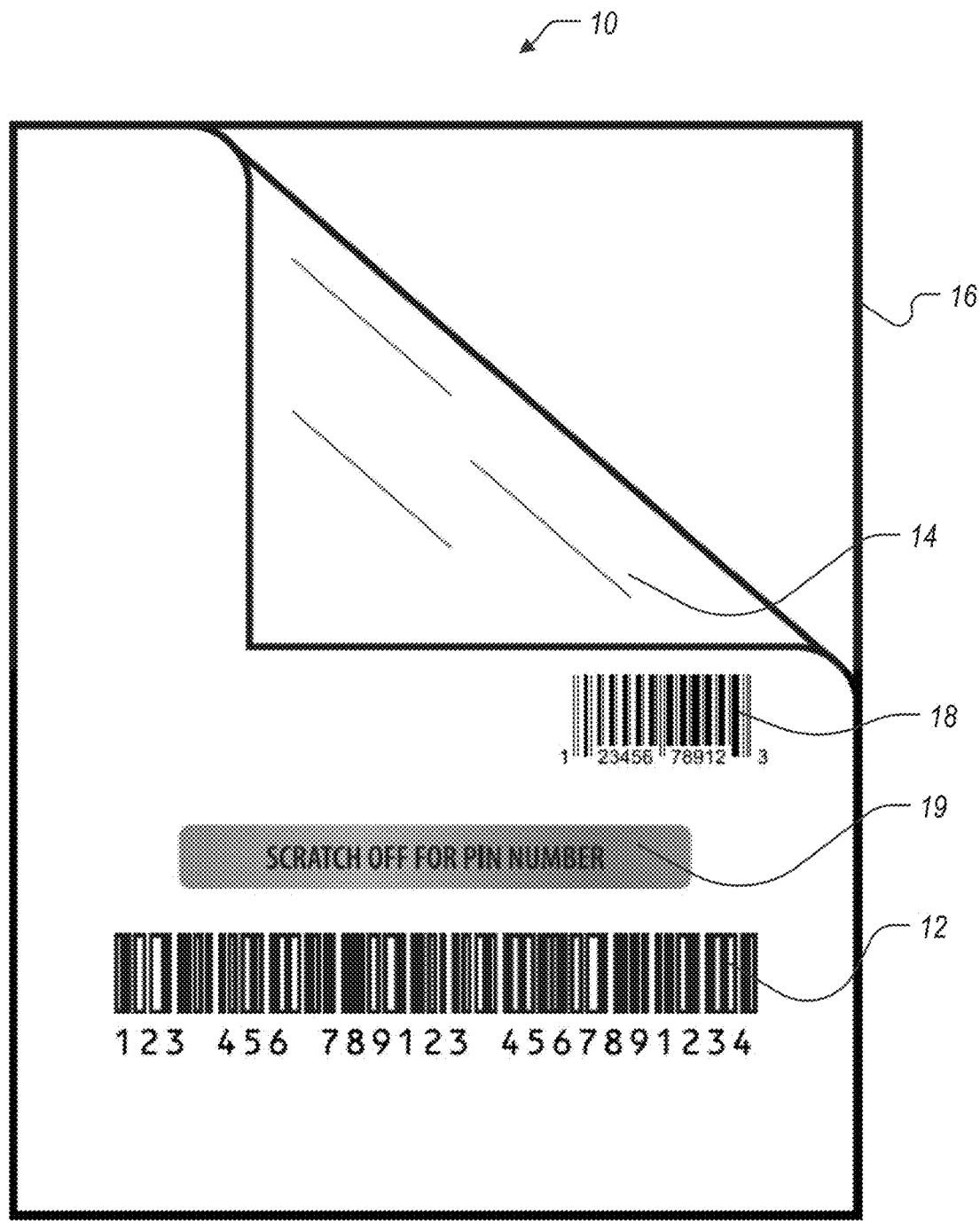
FIG. 2a and FIG. 2b show a paper-based printout sticker having a Universal Product Code (UPC) or other product code in addition to the wireless authorization codes according to the disclosure.
Figure 2B:
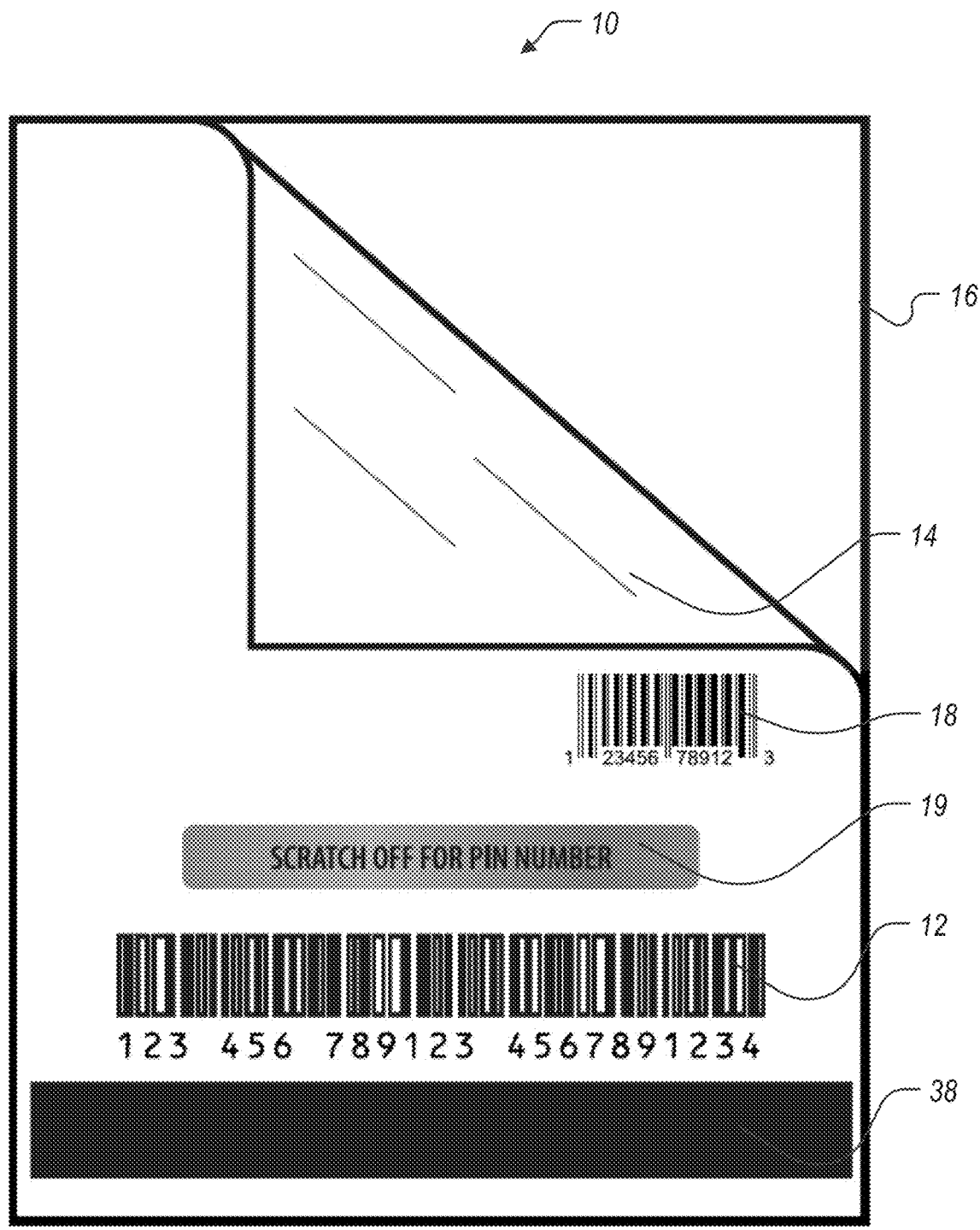

FIG. 2a and FIG. 2b shows a paper-based printout sticker 10 having a Universal Product Code (UPC) 18 or other product code, in addition to the wireless authorization code 12 according to the disclosure. In some aspects, the other product code may be a code associated with the European Article Numbering (EAN) system and/or the Japanese Article Numbering (JAN) system. In this regard, the merchant may cover an existing UPC for a product with the sticker 10 having the UPC 18. In this manner, the product that includes the sticker 10 can be easily distinguished from the product sold without the sticker 10. In addition, inventory of the product is greatly simplified. For example, the product manufacturer may simply sell the merchant the packaged product and the merchant may simply maintain an inventory of the product without the sticker 10. When the product with the sticker 10 is purchased, the sticker 10 may be placed on a product from inventory to replace the sold item. Optionally, the sticker 10 may include a personal identification number (PIN) 19 code for activating the authorization code 12. Also optionally, the PIN 19 may be covered with a material suitable for being scratched off to reveal the PIN 19. In a further aspect, FIG. 2b further illustrates a paper-based printout sticker 10 that may include a magnetic stripe 38 capable of storing data by modifying a magnetism of iron-based magnetic particles on a band of magnetic material. The magnetic stripe 38 may be read by swiping past a magnetic reading head.

To further simplify the inventory, the sticker 10 may be printed by the merchant as the stickers 10 are sold. That is, the merchant may be assigned a block of wireless authorization codes 12 available to be printed out and then may print out the stickers 10 on an "as needed" basis. Similarly, the wireless user may purchase the authorization codes 12 at a retail establishment, over the telephone, by mail, through a wireless service provider website or the like and print them out. Again, the authorization codes 12 may be pre-paid and/or activated at a point of sale or electronically over the phone or computer. The user may then print out the sticker 10 and place it on a suitable item such as a wireless device.

Figure 3:
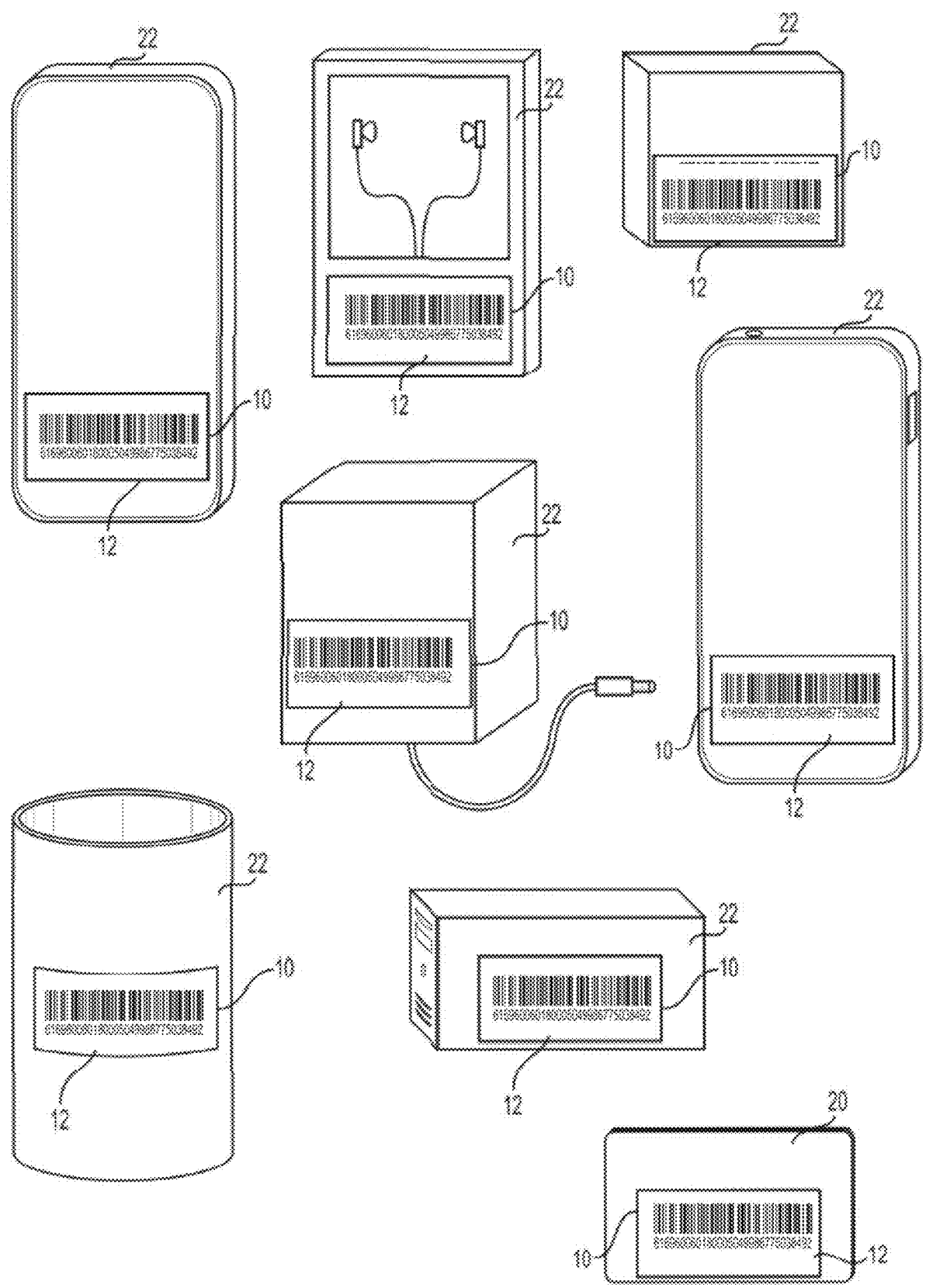
FIG. 3 shows a variety of products suitable for use with the sticker having the wireless authorization code according to the disclosure.

According to another aspect, the sticker 10 may be affixed to a card 20 as shown in FIG. 3. For example, the sticker 10 may be affixed to a blank or expired card 20 so that the card 20 may include a valid code 12. In this manner, expired or exhausted cards 20 may be reused. In addition, the merchant may reduce inventory issues surrounding maintaining a large supply of valid pre-paid codes 12. Instead, the sticker 10 may be printed and affixed to the card 20 as shown in FIG. 3. The authorization code 12 may provide a predetermined amount of wireless service as described above. The aspect of paper printout of the sticker 10 being affixed to the card 20 is merely exemplary. The paper printout of the sticker 10 can be used as-is or affixed to any suitable product.

FIG. 3 shows a variety of products 22 suitable for use with the sticker 10 having the wireless authorization code 12 according to the disclosure. The products 22 shown in FIG. 3 may include a headset, spare battery, charger, carrying case, or various unrelated items such as a drinking cup, magazine, coupon, brochure, and the like. Each of the products 22 may have the sticker 10 directly affixed and/or affixed to packaging for the product 22. The aspect of the sticker 10 being on any particular product and/or packaging is merely exemplary.

The stickers 10 may be placed on the products 22 at any suitable time. For example, the sticker 10 may be affixed to the product 22 prior to shipping to the point of sale. In another example, the sticker 10 may be placed on the product 22 at the point of sale by the merchant, for example. In yet another example, the sticker 10 may be placed on the product 22 by the wireless user following the purchase of the product 22 and the sticker 10. Of course, other implementations are contemplated and are within the spirit and scope of the disclosure as well.

Figure 4:
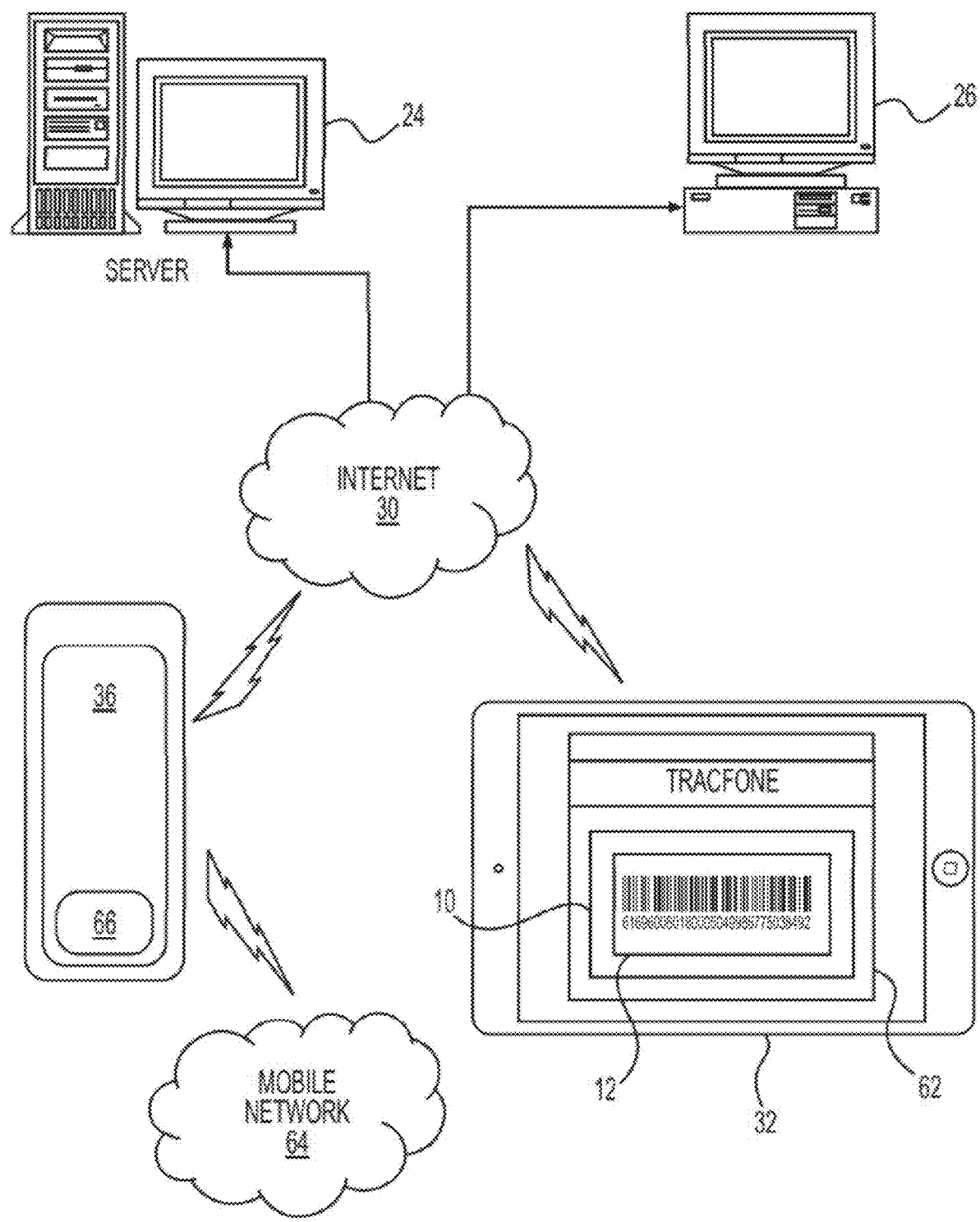
FIG. 4 illustrates a client-server arrangement in accordance with the disclosure.

FIG. 4 illustrates an arrangement of a client-server system in accordance with the disclosure. In one aspect, the system may be a website, which implements a web-store that provides the sticker 10. The system includes a server 24, a plurality of client devices 26 and a network connection 28. The server 24 communicates with the client devices 26 by employing the network connection 28. The network connection may be facilitated by an Internet connection. The client devices 26 may be personal communication devices that have web browsing capabilities. Examples of such devices include tablet computers 32, personal computers 34, PDAs, and wireless devices 36.

In operation, the server 24 may generate web pages that are provided to the client devices 26 in response to requests in the form of URL submissions. The web pages include static code pages as well as dynamic code pages, which are constructed based on user input and other system criteria. The web pages include controls, which facilitate user data entry. Such controls include entry boxes, selection boxes, toggle buttons, drop down lists, and the like. The user device operator can employ the client devices 26 to transmit web page data to the server. The structure and operation of the server 24 is discussed below.

Figure 5:
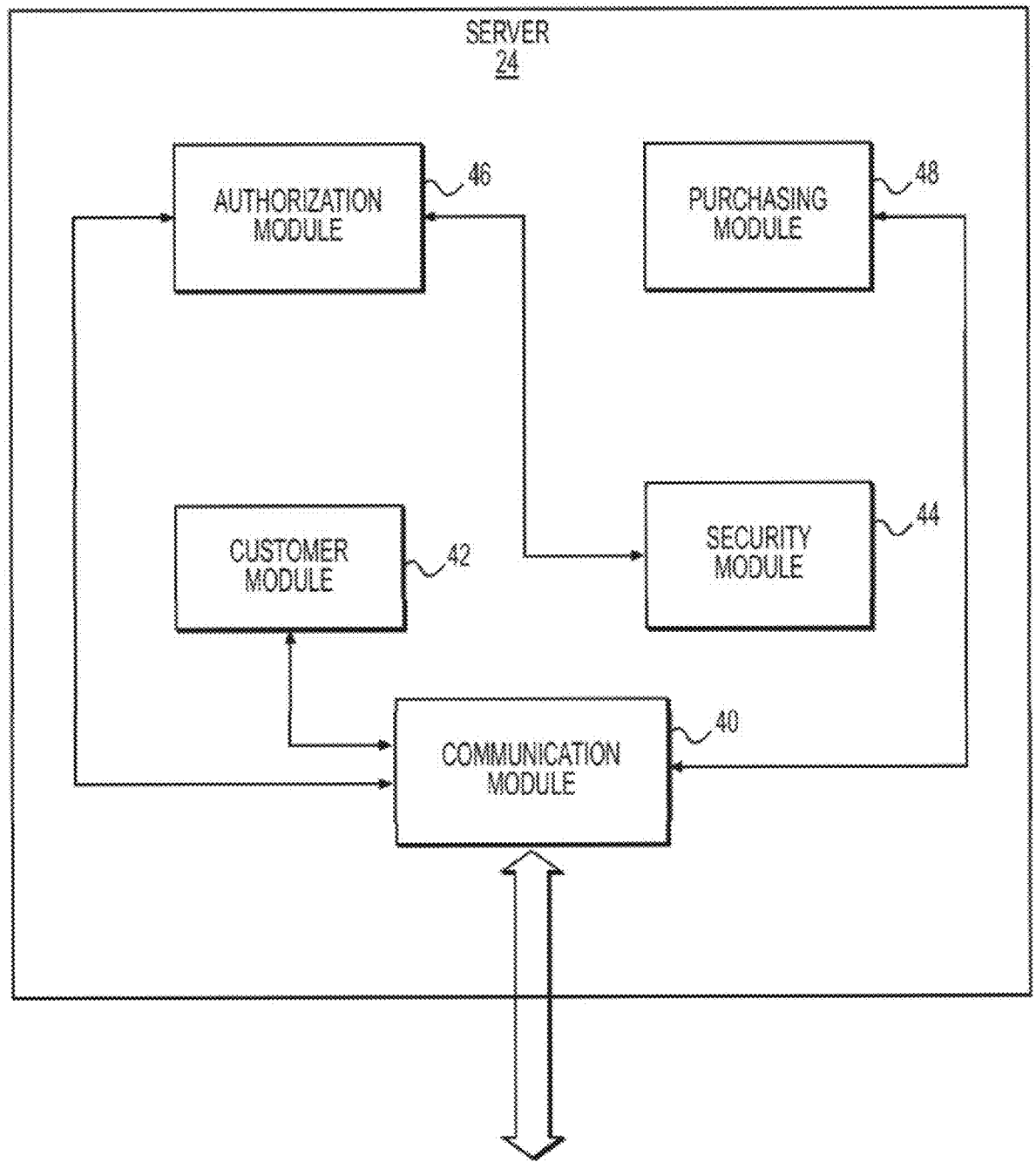
FIG. 5 illustrates the logical arrangement of a server in accordance with the disclosure.

FIG. 5 illustrates the structure of a server 24 of the disclosure. As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components. In one aspect, the components are implemented as software program modules.

The server includes a communication module 40, a customer module 42, a security module 44, an authorization module 46, and a purchasing module 48. The communication module 40 may be coupled to the authorization module 46 to receive authorization codes, which are used to authorize or activate wireless devices. The communication module 40 may also be coupled to the customer module 42 so as to retrieve customer account data, if available. In an alternate aspect, the customer module 42 is not included in the server 24. The communication module 40 may also be coupled to the purchasing module 48 to execute payment transactions. For example, a credit card payment transaction is facilitated by employing the purchasing module 48.

The authorization module 46 may be further coupled to the security module 44, which generates the authorization codes 12 for the stickers 10. The security module 44 provides functions and algorithms for generating the activation codes 12. For example, in one aspect, the activation codes 12 for particular wireless devices may depend on the providing a wireless device information. Accordingly, the security module 44 stores such data corresponding to each wireless device. When activation codes for the wireless devices are requested, the security module 44 responds by transmitting the activation codes associated to the wireless devices.

In operation, the communication module 40 provides web pages to a user system in response to the web page requests. The communication module 40 responds to the web page requests by employing the various modules of the server 24. For example, in response to a request for a customer information page, the communication module 40 requests data from the customer module 42 so as to generate a dynamic web page, which is transmitted to the user system.

When the user requests to purchase the sticker 10 having the authorization code 12, the communication module 40 transmits a purchase web page to the user system. The user employs controls within the received web page so as to enter payment data, including payment information. The user system transmits the resultant data to the communication module 40. The payment transaction may then be executed by the purchasing module 48, which provides a corresponding response to the communication module 40. The authorization codes 12 may then be transmitted to the user system as a web page 62. In one aspect, the authorization codes 12 are transmitted over a secure connection such as secure socket layer (SSL) or the like. Alternatively, the authorization codes 12 may be provided to the user on the sticker 10 (via mail, by retail merchant, or the like). Alternatively, the authorization codes 12 may be provided to a user and printed on a paper printout of the sticker 10 (via mail, by retail merchant, internet-enabled computer or the like).

FIG. 5 implementation you may be utilized by a single wireless user. Alternatively or additionally, the FIG. 5 implementation may be utilized by a retailer at a point-of-sale. Alternatively or additionally, the FIG. 5 implementation may be utilized by a distributor. Other applications of the FIG. 5 implementation are contemplated.

Figure 6:
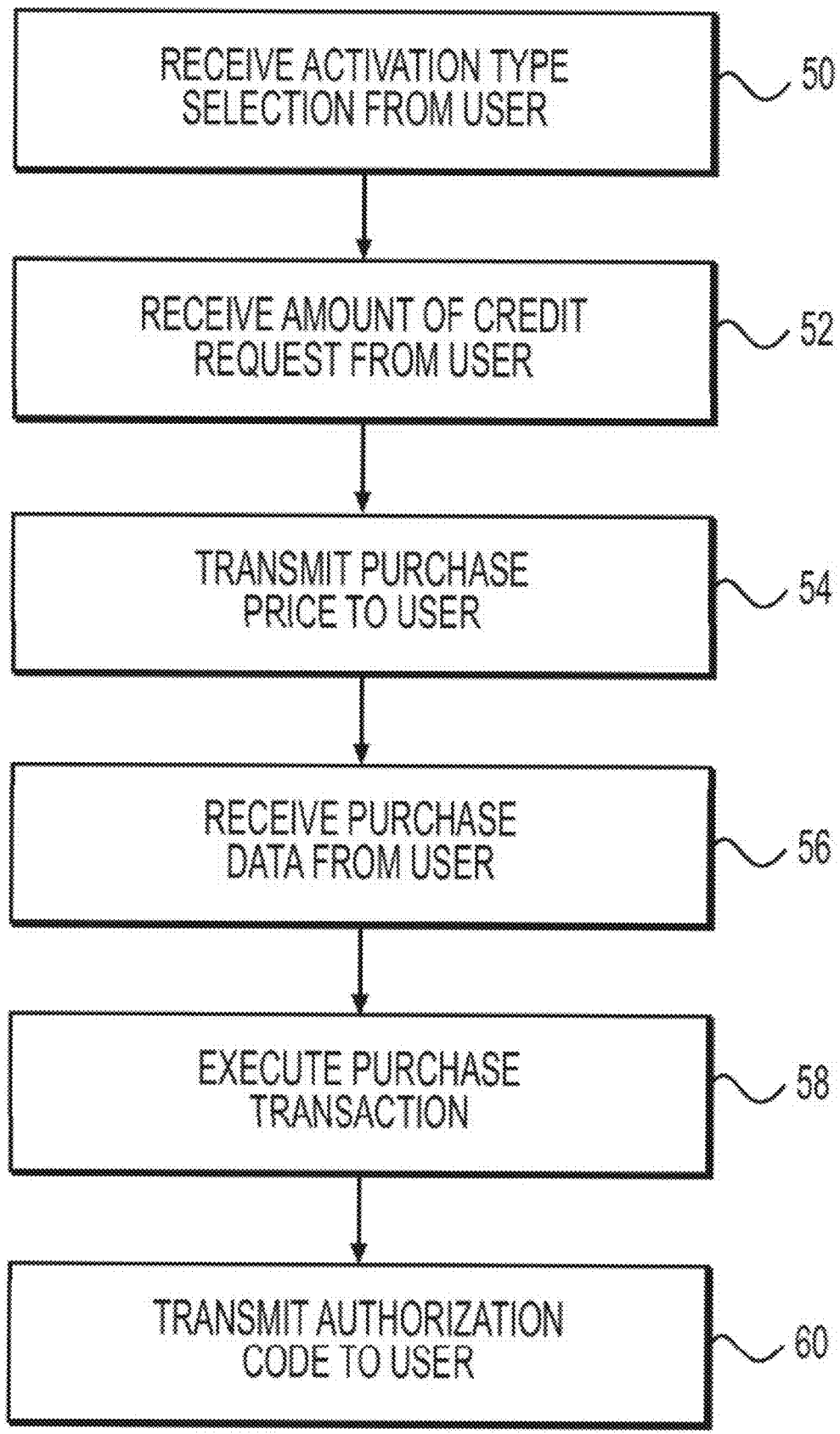
FIG. 6 is a flow diagram illustrating the operation of the server when facilitating a purchase of prepaid wireless services.

FIG. 6 illustrates the operation of the server 24 when the user selects to purchase an activation code from the provider. The user first connects to the provider website by submitting the provider website URL in the user browser application. The user then selects to purchase an authorization code from a start web-page. The user is provided with a second web-page that requests an activation type selection. For example, the user may wish to activate local calling functionality only. Additionally, the user may wish to activate roaming functionality. Accordingly, the user can select the desired activation from the controls provided by the web-page (step 50). In addition, the user is prompted to enter an amount of service credit, number of authorization codes or the like in an entry box of the page.

The server 24 receives the user data (step 52) and provides a web-page to the user system that includes a payment indication for the requested authorization (step 54). The user is provided with controls, which allow for the selection and entry of payment data. For example, the user selects a credit card type and enters a credit card number with a corresponding expiration date. The server 24 receives the payment data from the user and transmits the data to the purchasing module 48 (step 56). The purchasing module 48 processes the data according to the selected payment type (step 58). If the payment transaction is successful, the purchasing module 48 transmits a corresponding signal to the communication module 40. The communication module 40 requests authorization codes from the authorization module 46. At this time, the user may be required to provide a unit identification so as to enable the server 24 to select proper authorization codes. In another aspect, the server provides an authorization code regardless of the unit identification. The authorization module 46 employs the security module 44 to identify authorization codes for the user request, as discussed above. The authorization codes are then transmitted to the user system, preferably as part of a web-page (step 60). The authorization codes are advantageously provided over a secure connection.

Referring back to FIG. 4, the user may then use the authorization code 12 to add service, activate service, and/or authorize service for one or more wireless devices. For example, a user can enter the authorization code 12 into the wireless device 36 of FIG. 4. The wireless device 36 may transmit the authorization code 12 to the Internet 30, to a mobile network 64 or the like. The transmitted authorization code 12 may be verified by the server 24, a server provisioning wireless service to the user, or the like. Additionally, the server 24, the server provisioning wireless server to the user, or the like may respond to the user indicating that the code has been verified, service has been added, service has been authorized, service has been activated, or the like.

Additionally, the wireless device 36 may include an application, memory, or the like (hereinafter application 66) that is configured to implement the authorization code transmission process. For example, the application 66 may be a so-called pre-paid engine. The application 66 may also receive a response from the server 24, the server provisioning wireless server to the user, or the like indicating that the code has been verified, service has been added, service has been authorized, service has been activated or the like. The application 66 may also be configured to control use of the wireless device 36 based on interactions with the server 24, the server provisioning wireless server to the user, or the like.

In an alternative aspect, the authorization code 12 may be transmitted over the cellular communication link to the wireless device 36 without the need for the user to manually enter a code. In this regard, purchasing the multiple authorization codes, as described above, also includes transmission of the codes to one or more wireless devices 36. Similarly, purchasing multiple authorization codes may simply signal the mobile network 64 or the application 66 to add, activate, authorize or the like wireless service to the wireless device 36.

In an alternative aspect, a user can enter one of the authorization codes into the personal computer 34 or tablet computer 32 of FIG. 4. The personal computer 34 or tablet computer 32 may transmit the authorization code to the Internet 30, or the like. The transmitted authorization code may be verified by the server 24, a server provisioning wireless service to the user, or the like. Additionally, the server 24, the server provisioning wireless server to the user, or the like may respond to the user indicating that the code has been verified, service has been added, service has been authorized, service has been activated, or the like. The application 66 may also receive a response from the server 24, the server provisioning wireless server to the user, or the like indicating that the code has been verified, service has been added, service has been authorized, service has been activated or the like. The application 66 may also be configured to control use of the wireless device 36 based on interaction with the server 24, the server provisioning wireless server to the user, or the like.

In yet another aspect, where the credit level for a user is stored within the system, the user does not receive an authorization code but is able to use the service for each of the users they want to provide service shortly after making the purchase.

Although the disclosure was discussed in terms of certain preferred aspects, the description is not limited to such aspects. Rather, the disclosure includes other aspects including those apparent to a person of ordinary skill in the art. Thus, the scope of the disclosure should not be limited by the preceding description but should be ascertained by reference to the claims that follow.

For the purposes of this disclosure a computer readable medium stores computer data, which data can include computer program code that is executable by a processor of the server, PC, SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™ Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for adding, authorizing, and activating pre-paid wireless service comprising:
    a server configured to generate an authorization code that adds, authorizes, and activates pre-paid wireless service for a wireless device;
    a sticker having the authorization code on a first side, the sticker having an adhesive on a second side opposite to the first side, the sticker being configured to be affixed to a surface of a product;
    the authorization code further comprising a personal identification number (PIN), the personal identification number (PIN) being arranged on the sticker and the personal identification number (PIN) being covered with a material configured to conceal the personal identification number (PIN) and the material being configured to be scratched off to reveal the personal identification number (PIN);
    a wireless device application configured to implement an authorization code transmission process to transmit the authorization code to the server over a network from the wireless device to request provisioning of wireless services from the server;
    the server further configured to receive the authorization code over the network from the wireless device;
    the server further configured to verify that the authorization code from the wireless device is authentic; and
    the server further configured to at least one of add, authorize, and activate the pre-paid wireless service for the wireless device in response to receiving and verifying the authorization code from the wireless device,
wherein the authorization code authorizes the server to provision wireless services for the wireless device that includes wireless airtime, wireless messaging, and wireless data.

2. The system according to claim 1, further comprising a product packaging configured to retain the product for sales,
wherein the sticker is configured to be affixed to a surface of the product packaging, and
wherein the authorization code is activated by a point-of-sale.

3. The system according to claim 2, wherein the authorization code authorizes wireless services that further includes days of wireless service.

4. The system according to claim 1, further comprising a card, wherein the sticker is configured to be affixed to a surface of the card.

5. The system according to claim 1,
wherein the server is further configured to store data corresponding to the wireless device; and
wherein the authorization code is activated by a point-of-sale.

6. A method for adding, authorizing, and activating pre-paid wireless service comprising:
providing a server configured to generate an authorization code that adds, authorizes, and activates pre-paid wireless service for a wireless device;
affixing a sticker having the authorization code to a product or affixing the sticker to a packaging of the product wherein the authorization code further comprises a personal identification number (PIN), the personal identification number (PIN) being arranged on the sticker and the personal identification number (PIN) being covered with a material configured to conceal the personal identification number (PIN) and the material being configured to be scratched off to reveal the personal identification number (PIN);
implementing a wireless device application configured to implement an authorization code transmission process to transmit the authorization code to the server over a network from the wireless device to request provisioning of wireless services from the server;
receiving over the network the authorization code to the server, the authorization code being sent over the network from the wireless device;
verifying that the authorization code is authentic with the server; and
at least one of adding, authorizing, and activating the pre-paid wireless service for the wireless device with the server in response to receiving and verifying the authorization code from the wireless device,
wherein the authorization code authorizes the server to provision wireless services for the wireless device that includes wireless airtime, wireless messaging, and wireless data.

7. The method according to claim 6, further comprising providing a bar code to the sticker,
wherein the authorization code is activated by a point-of-sale.

8. The method according to claim 6, wherein the authorization code is activated by a point-of-sale.

9. The method according to claim 6, further comprising providing a bar code to the sticker.

10. The method according to claim 6, further comprising: storing in a security module data corresponding to the wireless device,
wherein the product is a card and the sticker is affixed to a surface of the card; and
wherein the authorization code is activated by a point-of-sale.

11. A method for adding, authorizing, or activating pre-paid wireless service, comprising:
providing a first web page with a server system to a user of pre-paid wireless service, the first web page including at least an interface for entering information;
providing an interface with the server system on said first web page for purchasing pre-paid wireless service for a wireless device;
receiving a request with the server system for the purchase of the pre-paid wireless service, the request including financial transaction data for purchasing the pre-paid wireless service;
generating an authorization code with the server system that at least one of adds, authorizes, and activates the pre-paid wireless service for a wireless device;
transmitting with the server system a print file configured to print a sticker, the sticker including an authorization code in response to the purchase of the pre-paid wireless service;
configuring the sticker to have the authorization code on a first side, the sticker having an adhesive on a second side opposite to the first side, the sticker being configured to be affixed to a surface of a product and wherein the authorization code further comprises a personal identification number (PIN);
arranging the personal identification number (PIN) on the sticker;
covering the personal identification number (PIN) with a material configured to conceal the personal identification number (PIN) and the material being configured to be scratched off to reveal the personal identification number (PIN);
affixing the sticker to a card;
implementing a wireless device application configured to implement an authorization code transmission process to transmit the authorization code to the server system over a network from the wireless device to request provisioning of wireless services from the server system;
receiving over the network the authorization code to the server system, the authorization code being sent over the network from the wireless device;
verifying that the authorization code is authentic with the server system; and
at least one of adding, authorizing, and activating the pre-paid wireless service for the wireless device with the server system in response to receiving and verifying the authorization code from the wireless device,
wherein the authorization code authorizes the server system to provision wireless services for the wireless device that includes wireless airtime, wireless messaging, and wireless data.

12. The method according to claim 11, further comprising printing the sticker that includes arranging the personal identification number (PIN) on the sticker, wherein the authorization code is activated by a point-of-sale.

13. The method according to claim 12, wherein the printing the sticker further includes covering the personal identification number (PIN) with a material configured to conceal the PIN, and wherein the material being configured to be scratched off to reveal the personal identification number (PIN).

14. The method according to claim 12, further comprising affixing the sticker to a product.

15. A system for adding, authorizing, or activating pre-paid wireless service, comprising:
- a server configured to provide a first web page to a user including at least an interface for entering information;
- the server further configured to provide an interface on said first web page for purchasing pre-paid wireless service for a wireless device;
- the server configured to receive a request with for the purchase of the pre-paid wireless service, the request including financial transaction data for purchasing additional airtime;
- the server configured to generate an authorization code that adds, authorizes, and activates the pre-paid wireless service for a wireless device;
- the server configured to transmit a print file for a sticker having an authorization code in response to the purchase of the pre-paid wireless service;
- the sticker having the authorization code on a first side, the sticker having an adhesive on a second side opposite to the first side, the sticker being configured to be affixed to a surface of a product, and wherein the authorization code further comprises a personal identification number (PIN), the personal identification number (PIN) being arranged on the sticker, the personal identification number (PIN) being covered with a material configured to conceal the personal identification number (PIN), and the material being configured to be scratched off to reveal the personal identification number (PIN);
- a product packaging configured to retain the product for sales, wherein the sticker is configured to be affixed to a surface of the product packaging;
- a wireless device application configured to implement an authorization code transmission process to transmit the authorization code to the server over a network from the wireless device to request provisioning of the pre-paid wireless services from the server;
- the server further configured to receive the authorization code over the network from the wireless device;
- the server further configured to verify that the authorization code from the wireless device is authentic; and
- the server further configured to at least one of add, authorize, and activate the pre-paid wireless service for the wireless device in response to receiving and verifying the authorization code from the wireless device,
- wherein the authorization code authorizes the server to provision wireless services for the wireless device that includes wireless airtime, wireless messaging, and wireless data.

16. The system according to claim 15, further comprising:
- a printer to print the sticker that includes the personal identification number (PIN) associated with the authorization code, the personal identification number (PIN) being arranged on the sticker, the personal identification number (PIN) being covered with the material configured to conceal the personal identification number (PIN), and the material being configured to be scratched off to reveal the personal identification number (PIN).

17. The system according to claim 16, wherein the authorization code is activated by a point-of-sale.

18. The system according to claim 16, further comprising:
- a card, wherein the sticker is configured to be affixed to a surface of the card; and
- the server is further configured to store data corresponding to the wireless device.

19. The system according to claim 16, further comprising a card, wherein the sticker is configured to be affixed to a surface of the card.

20. The system according to claim 16, further comprising:
- a product code disposed upon the sticker; and
- the server further configured to store data corresponding to the wireless device.

\* \* \* \* \*